(12) United States Patent
Ito

(10) Patent No.: US 10,023,082 B2
(45) Date of Patent: **\*Jul. 17, 2018**

(54) SEAT FOR VEHICLE

(71) Applicant: TS TECH CO., LTD., Asaka-shi, Saitama (JP)

(72) Inventor: Teppei Ito, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/216,234

(22) Filed: Jul. 21, 2016

(65) Prior Publication Data

US 2016/0325648 A1 Nov. 10, 2016

Related U.S. Application Data

(62) Division of application No. 14/443,233, filed as application No. PCT/JP2013/081048 on Nov. 18, 2013, now Pat. No. 9,415,709.

(30) Foreign Application Priority Data

Nov. 19, 2012 (JP) .................................. 2012-253641

(51) Int. Cl.
*B60N 2/427* (2006.01)
*B60N 2/68* (2006.01)
*B60N 2/42* (2006.01)
*B60N 2/22* (2006.01)

(52) U.S. Cl.
CPC ........... *B60N 2/42709* (2013.01); *B60N 2/22* (2013.01); *B60N 2/4228* (2013.01); *B60N 2/42745* (2013.01); *B60N 2/68* (2013.01)

(58) Field of Classification Search
CPC .......... B60N 2/68; B60N 2/22; B60N 2/4228; B60N 2/42745; B60N 2/42709
See application file for complete search history.

(56) References Cited

U.S. PATENT DOCUMENTS 3,501,200 A 3/1970 Ohta
3,544,164 A 12/1970 Ohta
6,523,893 B2 2/2003 Kamper et al.
(Continued)

FOREIGN PATENT DOCUMENTS

JP 2001-178584 A 7/2001
JP 2004-351973 A 12/2004
(Continued)

*Primary Examiner* — Philip F Gabler
(74) *Attorney, Agent, or Firm* — Drinker Biddle & Reath LLP

(57) ABSTRACT

Provided is a vehicle seat in which the transmission direction of deformation of a seat when an impact load is applied thereto is diffused so that impact absorbability is improved. This vehicle seat includes a seat back having a seat back frame that serves as a framework. The seat back frame has side frames positioned on the left and right sides, and a lower frame connecting lower parts of the side frames. The lower frame has a weakened part that is deformed when an impact load is applied, and a deformation guiding part for guiding the deformation direction of the weakened part. The weakened part and the deformation guiding part are arranged in the centers of areas obtained by extending the center portion of the lower frame toward the right and left sides with the same vertical-direction width, are provided on the same horizontal plane.

7 Claims, 7 Drawing Sheets

(56) References Cited

U.S. PATENT DOCUMENTS

| | | | |
|---|---|---|---|
| 6,709,053 | B1 | 3/2004 | Humer et al. |
| 8,047,605 | B2 | 11/2011 | Yamazaki et al. |
| 2011/0193379 | A1 | 8/2011 | Nitsuma |
| 2013/0257117 | A1 | 10/2013 | Seki et al. |
| 2014/0103626 | A1 | 4/2014 | Seki et al. |
| 2015/0203000 | A1 | 7/2015 | Fujita et al. |
| 2015/0352985 | A1 | 12/2015 | Seki et al. |

FOREIGN PATENT DOCUMENTS

| | | |
|---|---|---|
| JP | 2006-213201 A | 8/2006 |
| JP | 2009-166658 A | 7/2009 |
| WO | 2012/077764 A1 | 6/2012 |

SEAT FOR VEHICLE

CROSS REFERENCE TO RELATED APPLICATIONS

This application is a divisional application of U.S. patent application Ser. No. 14/443,233, filed May 15, 2015, which is the U.S. National Stage Entry application of PCT Application No. PCT/JP2013/081048, filed Nov. 18, 2013, which claims the priority benefit of Japanese Patent Application No. 2012-253641, filed Nov. 19, 2012, the contents being incorporated herein by reference.

BACKGROUND

Disclosed herein is a vehicle seat, and particularly, a vehicle seat with improved impact energy absorption efficiency upon a rear-end collision or the like.

Generally, when a so-called rear-end collision occurs, for example, when a vehicle is rear-ended or upon a significant collision occurring when a vehicle travels rearward, a seated occupant suddenly moves rearward due to an inertial force, and the occupant's upper body inclines rearward.

Various techniques have been proposed that are characterized by such a configuration that a side frame composing a seat back frame is bent when the sudden rearward movement of the occupant causes a rear load to be applied to the seat back frame so that the impact load applied to the occupant upon the rearward movement is mitigated (for example, International Patent Application Publication No. WO 2012/077764 ("the '764 Document")).

A seat back frame of a vehicle seat disclosed in the '764 Document includes side frames positioned on right and left sides, and a lower frame that connects lower parts of these side frames.

This lower frame is formed in a shape that is widened in a vertical direction as it extends from a center portion thereof toward right and left end portions thereof, and flexible narrow portions are formed in upper parts of the right and left end portions.

These narrow portions horizontally extend from both ends on the outer sides in the right-left direction of the right and left end portions toward the inner side of the seat, incline upward as they come toward the inner side of the seat, and are formed in long shapes extended toward the upper edges of the right and left end portions.

The configuration is such that, when an impact load is applied to the seat, for example, upon a rear-end collision of the vehicle or the like, these narrow portions are deformed preferentially, and the deformation is transmitted from the narrow portions toward upper edges of the right and left end portions.

In this way, by limiting deformed portions of the seat back frame, propagation of impact energy throughout the entirety of the seat back frame can be prevented, and impact energy can be absorbed stably.

In the vehicle seat as disclosed in the '764 Document, however, deformation is transmitted in one direction from the narrow portions toward the upper edges of the right and left end portions when an impact load is applied, and it is impossible to diffuse the direction in which warping deformation is transmitted. Therefore, a vehicle seat has been desired wherein impact absorbability is further improved, by diffusing the transmission direction of warping deformation of the seat.

Besides, the vehicle seat as disclosed in the '764 Document includes narrow portions that are preferentially subjected to warping deformation when an impact load is applied. Therefore, a vehicle seat in which the rigidity of the seat back frame in normal use is further improved has been desired.

Further, the narrow portions of the vehicle seat disclosed in the '764 Document are included in the right and left end portions of the lower frame, and are extend in long shapes from both ends on outer sides in the right-left direction toward the inner sides in the right-left direction. Therefore, a vehicle seat has been desired that is capable of sufficiently absorbing impact even when lengths of the narrow portions in the extension direction are decreased in the case where areas where the narrow portions are formed are limited.

SUMMARY

Various embodiments of the invention were made in light of the above-described problems, and it is an object of these to provide a vehicle seat that is capable of diffusing the direction in which warping deformation of a seat is transmitted when an impact load is applied upon a collision, particularly upon a rear-end collision, so that impact absorbability is further improved.

It is another object to provide a vehicle seat that is warped and deformed when an impact load is applied thereto to absorb the impact load, wherein rigidity of a seat back frame thereof in normal use is further improved.

It is still another object to provide a vehicle seat that includes weakened portions that sufficiently absorb impact when an impact load is applied and that are formed in compact sizes.

The above-described problem is solved by embodiments of a vehicle seat that include a seat back frame, wherein the seat back frame includes side frames that are positioned on right and left sides, and a lower frame that connects lower parts of the side frames, wherein the lower frame includes a weakened portion that is deformed when an impact load is applied, and a deformation guiding portion that guides a direction of the deformation of the weakened portion, wherein the lower frame is formed so that a width in a vertical direction of a center portion thereof is smaller than a width in the vertical direction of right and left end portions thereof, wherein the weakened portion is provided in an area obtained by extending the center portion of the lower frame toward right and left sides with the same vertical-direction width, and wherein the deformation guiding portion is provided at a position corresponding to the weakened portion as viewed in in the vertical direction.

In this way, the weakened portion is provided in an area obtained by extending the center portion of the lower frame toward right and left sides with the same vertical-direction width. Therefore, when an impact load is applied to the vehicle seat upon a rear-end collision or the like, the transmission directions of upward and downward warping deformation of the weakened portion starting from the weakened portion as a starting point can be diffused more easily. Therefore, a vehicle seat with further improved impact absorbability can be provided.

Further, since the deformation guiding portion is provided at a position corresponding to the weakened portion as viewed in the vertical direction, when an impact load is applied, the transmission direction of deformation starting from the weakened portion as a starting point is guided by the deformation guiding portion, whereby the deformation transmission direction can be more easily diffused from the weakened portion upward and downward.

Still further, since the weakened portion is provided in an area obtained by extending the center portion of the lower frame toward right and left sides with the same vertical-direction width in the lower frame, the weakened portion can be formed in a compact size.

Here, the configuration may be such that upper and lower edges of the center portion extend horizontally, and upper and lower edges of the right and left end portions extend continuously from the upper and lower edges of the center portion to spread upward and downward, respectively, and either one of the upper and lower edges of the lower frame starts extending upward or downward at positions in closer proximity to the weakened portion, as compared with the other one.

In this way, since the upper and lower edges of the right and left end portions extend continuously from the upper and lower edges of the center portion to spread upward and downward, respectively, the rigidity of the seat back frame in normal use can be further improved.

Further, since either one of the upper and lower edges of the lower frame starts extending upward or downward at positions in closer proximity to the weakened portion as compared with the other one, the rigidity of the seat back frame can be ensured on the other side, while on the one side, when an impact load is applied, deformation can be easily allowed to occur preferentially in the transmission direction of deformation starting from the weakened portion as a starting point. Therefore, the seat back frame can be formed in such a shape that a part with ensured rigidity and a part with a direction in which deformation is transmitted preferentially are taken into consideration.

Here, the configuration may be such that the weakened portion extends horizontally in a right-left direction, and the weakened portion and the deformation guiding portion are provided on a same horizontal plane.

In this way, the weakened portion and the deformation guiding portion are thus provided on the same horizontal plane. Therefore, the transmission direction of deformation starting from the weakened portion as a starting point can be more easily guided by the deformation guiding portion, and the direction can be more easily diffused from the weakened portion upward and downward.

Here, the configuration may be such that the vehicle seat further includes a seat cushion frame that includes cushion side frames positioned on right and left sides, wherein at least a part of the weakened portion is positioned at a lower position than an upper end of the cushion side frame, and is arranged along an outer edge of the cushion side frame.

In this way, at least a part of the weakened portion is positioned at a lower position than an upper end of the cushion side frame, and is arranged along an outer edge of the cushion side frame. Therefore, the weakened portion is arranged in close proximity to a portion connected to the cushion side frame in the lower frame, and therefore, more easily is subjected to concentration of stress due to an impact load. Therefore, the impact load can be absorbed efficiently. Further, the weakened portion is arranged along an outer edge of the cushion side frame. Therefore, when the weakened portion is formed, interference with the cushion side frame does not occur, and the operability is improved.

Here, the configuration may be such that the vehicle seat further includes a reclining mechanism that rotatably connects the seat back frame with respect to the seat cushion frame, wherein: the reclining mechanism includes spring members that are mounted on the cushion side frames and energize the seat back frame in an erected state; engagement members on which extension ends of the spring members are engaged are fixed on the lower frame; and the weakened portion is provided at a lower position than portions where the engagement members are fixed.

In this way, the engagement members on which extension ends of the spring members are engaged are fixed on the lower frame and the weakened portion is provided at a lower position than portions where the engagement members are fixed. Therefore, this weakened portion is arranged in close proximity to the reclining mechanism, particularly in a portion thereof that includes the spring member, in the lower frame. The weakened portion, therefore, is more easily subjected to concentration of stress due to an impact load. As a result, an impact load is can be absorbed more efficiently.

Here, the configuration may be such that the right and left end portions include deformation areas that are deformed due to an impact load from the weakened portion toward at least one of the upper and lower edges of the right and left end portions; the lower frame has at least one hole portion; and the hole portion is provided in the deformation areas.

In this way, the hole portion is provided in the deformation areas that are deformed due to an impact load, in the right and left end portions of the lower frame. Therefore, when an impact load is applied, the transmission direction of deformation starting from the weakened portion as a starting point is easily diffused toward the hole portion. In other words, providing a hole portion in the lower frame makes it possible to guide the direction in which deformation is desirably transmitted from the weakened portion as a starting point.

Here, the configuration may be such that, in the upper and lower edges of the right and left end portions, notch portions that are notched in the deformation areas are formed; and the hole portions are provided on straight lines extended between right and left inner-side ends of the weakened portions and the notch portions.

This configuration makes it possible that when an impact load is applied, the transmission direction of deformation starting from the weakened portion as a starting point is easily diffused toward portions where the hole portions and the notch portions are formed.

Here, the configuration may be such that flange portions are provided on the upper and lower edges of the lower frame, the flange portions protruding in a front to back direction from the upper and lower edges; and the flange portions are notched in the deformation areas, in the upper and lower edges.

In this way, the flange portions are provided in the upper and lower edges of the lower frame, and the flange portions are notched in the deformation areas in the upper and lower edges. Therefore, when an impact load is applied, a transmission direction of deformation starting from the weakened portion as a starting point is easily diffused toward portions where the flange portions are notched in the upper and lower edges of the lower frame. In other words, providing portions where the flange portions are notched in the upper and lower edges of the lower frame makes it possible to guide the direction in which deformation is desirably transmitted from the weakened portion as a starting point.

Here, the configuration may be such that the deformation guiding portions are provided in the right and left end portions, in the lower frame; the lower frame includes a protrusion portion in the center portion; and the protrusion portion extends in the right-left direction between a pair of the deformation guiding portions.

In this way, the lower frame includes the protrusion portion in the center portion; and the protrusion portion extends in the right-left direction between a pair of the deformation guiding portions. Therefore, the provision of the protrusion portion ensures the rigidity of the lower frame, and stress concentration is easily achieved at the weakened portions.

Therefore, the rigidity of the seat back frame in normal use can be improved, and when an impact load is applied, stress concentration can be achieved at the weakened portions, whereby the impact load can be absorbed efficiently.

Here, the configuration may be such that the deformation guiding portions are provided in the right and left end portions, in the lower frame; the weakened portions are provided on outer sides in the right-left direction, with respect to the deformation guiding portions; the lower frame includes a protrusion portion in the center portion; and the protrusion portion extends, in the right-left direction, to positions interposed between the deformation guiding portions and the weakened portions.

In this way, the weakened portions are provided on outer sides in the right-left direction, with respect to the deformation guiding portions, and the protrusion portion extends, in the right-left direction, to positions interposed between the deformation guiding portions and the weakened portions. Therefore, the provision of the protrusion portion further ensures the rigidity of the lower frame, and stress concentration is easily achieved at the weakened portions.

Here, the configuration may be such that the weakened portions are provided in centers in areas obtained by extending the center portion toward the right and left sides with the same vertical-direction width, in the lower frame.

This configuration makes it further easier to diffuse the transmission directions of warping deformation starting from the weakened portions as starting points upward and downward with respect to the weakened portions. Therefore, impact absorbability can be further improved.

Further, the weakened portions can be formed in compact sizes.

Here, the configuration may be such that the weakened portions are provided in the right and left end portions, in the lower frame; and each weakened portion includes a horizontal portion and at least one of inclined portions, wherein the horizontal portion extends horizontally in the right-left direction, and the inclined portions are an upward inclined portion and a downward inclined portion that extend continuously from the horizontal portion to an inner side in the right-left direction to be inclined upward and downward, respectively.

This configuration makes it possible to easily diffuse the transmission directions of deformation starting from the weakened portions as starting points toward a direction in which the at least one of the upward inclined portion and the downward inclined portion extends.

Since the weakened portions are provided in areas obtained by extending the center portion of the lower frame toward right and left sides with the same vertical-direction width, when an impact load is applied upon a rear-end collision or the like, the transmission directions of upward and downward warping deformation of the weakened portions starting from the weakened portions as starting points can be diffused more easily. Therefore, a vehicle seat with further improved impact absorbability can be provided.

Further, since the deformation guiding portion is provided at a position corresponding to the weakened portion as viewed in the vertical direction, when an impact load is applied, the transmission direction of deformation starting from the weakened portion as a starting point is guided by the deformation guiding portion, whereby the deformation transmission direction can be more easily diffused from the weakened portion upward and downward.

Still further, since the weakened portion is provided in an area obtained by extending the center portion of the lower frame toward right and left sides with the same vertical-direction width in the lower frame, the weakened portion can be formed in a compact size.

According to one or more embodiments, the upper and lower edges of the right and left end portions extend continuously from the upper and lower edges of the center portion to spread upward and downward, respectively, the rigidity of the seat back frame in normal use can be further improved.

Further, since either one of the upper and lower edges of the lower frame starts extending upward or downward at positions in closer proximity to the weakened portion as compared with the other one, the rigidity of the seat back frame can be ensured on the other side, while on the one side, when an impact load is applied, deformation can be easily allowed to occur preferentially in the transmission direction of deformation starting from the weakened portion as a starting point. Therefore, the seat back frame can be formed in such a shape that a part with ensured rigidity and a part with a direction in which deformation is transmitted preferentially are taken into consideration.

According to one or more embodiments, the weakened portion and the deformation guiding portion are thus provided on the same horizontal plane. Therefore, the transmission direction of deformation starting from the weakened portion as a starting point can be more easily guided by the deformation guiding portion, and the direction can be more easily diffused from the weakened portion upward and downward.

According to one or more embodiments, at least a part of the weakened portion is positioned at a lower position than an upper end of the cushion side frame, and is arranged along an outer edge of the cushion side frame. Therefore, the weakened portion is arranged in close proximity to a portion connected to the cushion side frame in the lower frame, and therefore, more easily is subjected to a concentration of stress due to an impact load. Therefore, the impact load can be absorbed efficiently. Further, the weakened portion is arranged along an outer edge of the cushion side frame. Therefore, when the weakened portion is formed, interference with the cushion side frame does not occur, and the operability is improved.

According to one or more embodiments, the engagement members on which extension ends of the spring members are engaged are fixed on the lower frame and the weakened portion is provided at a lower position than portions where the engagement members are fixed. Therefore, this weakened portion is arranged in close proximity to the reclining mechanism, particularly in a portion thereof that includes the spring member, in the lower frame. The weakened portion, therefore, is more easily subjected to concentration of stress due to an impact load. As a result, an impact load is can be absorbed more efficiently.

According to one or more embodiments, the hole portion is provided in the deformation areas that are deformed due to an impact load, in the right and left end portions of the lower frame. Therefore, when an impact load is applied, the transmission direction of deformation starting from the weakened portion as a starting point is easily diffused toward the hole portion. In other words, providing a hole portion in the lower frame makes it possible to guide the direction in which deformation is desirably transmitted from the weakened portion as a starting point.

According to one or more embodiments, when an impact load is applied, the transmission direction of deformation starting from the weakened portion as a starting point can be easily diffused toward portions where the hole portions and the notch portions are formed.

According to one or more embodiments, the flange portions are provided in the upper and lower edges of the lower frame, and the flange portions are notched in the deformation areas in the upper and lower edges. Therefore, when an impact load is applied, a transmission direction of deformation starting from the weakened portion as a starting point is easily diffused toward portions where the flange portions are notched in the upper and lower edges of the lower frame. In other words, providing portions where the flange portions are notched in the upper and lower edges of the lower frame makes it possible to guide the direction in which deformation is desirably transmitted from the weakened portion as a starting point.

According to one or more embodiments, the lower frame includes a protrusion portion in the center portion; and the protrusion portion extends in the right-left direction between a pair of the deformation guiding portions. Therefore, the provision of the protrusion portion ensures the rigidity of the lower frame, and stress concentration is easily achieved at the weakened portions.

Therefore, the rigidity of the seat back frame in normal use can be improved, and when an impact load is applied, stress concentration can be achieved at the weakened portions, whereby the impact load can be absorbed efficiently.

According to one or more embodiments, the weakened portions are provided on outer sides in the right-left direction, with respect to the deformation guiding portions and the protrusion portion extends, in the right-left direction, to positions interposed between the deformation guiding portions and the weakened portions. Therefore, the provision of the protrusion portion further ensures the rigidity of the lower frame, and stress concentration is easily achieved at the weakened portions.

According to one or more embodiments, the transmission directions of warping deformation starting from the weakened portions as starting points can be more easily diffused upward and downward with respect to the weakened portions. Therefore, impact absorbability can be further improved. Further, the weakened portions can be formed in compact sizes.

According to one or more embodiments, the transmission directions of deformation starting from the weakened portions as starting points can be easily diffused toward a direction in which the at least one of the upward inclined portion and the downward inclined portion extends.

DETAILED DESCRIPTION

Hereinafter, embodiments of the present invention will be described with reference to the drawings. The members, the arrangements, and the like described below do not limit the invention, and may be modified into various forms in accordance with the spirit of the invention.

The present embodiment relates to an invention of a vehicle seat in which weakened portions and deformation guiding portions are provided in right and left end portions of a lower frame of a seat back frame, and the weakened portions and the deformation guiding portions are positioned in the centers in areas obtained by extending the lower frame center portion toward the right and left sides with the same vertical-direction width.

Figure 1:
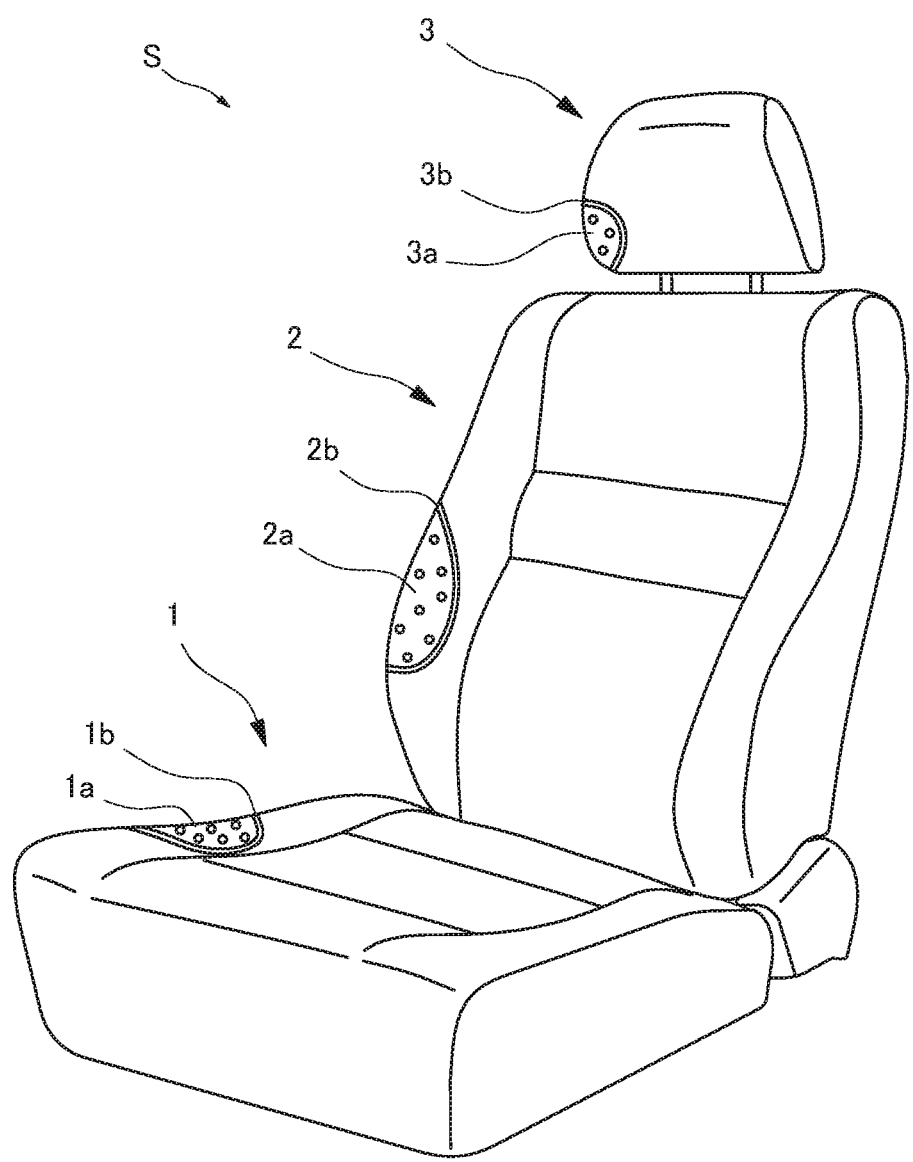
FIG. 1 is a schematic perspective view of a vehicle seat according to an embodiment.
Figure 2:
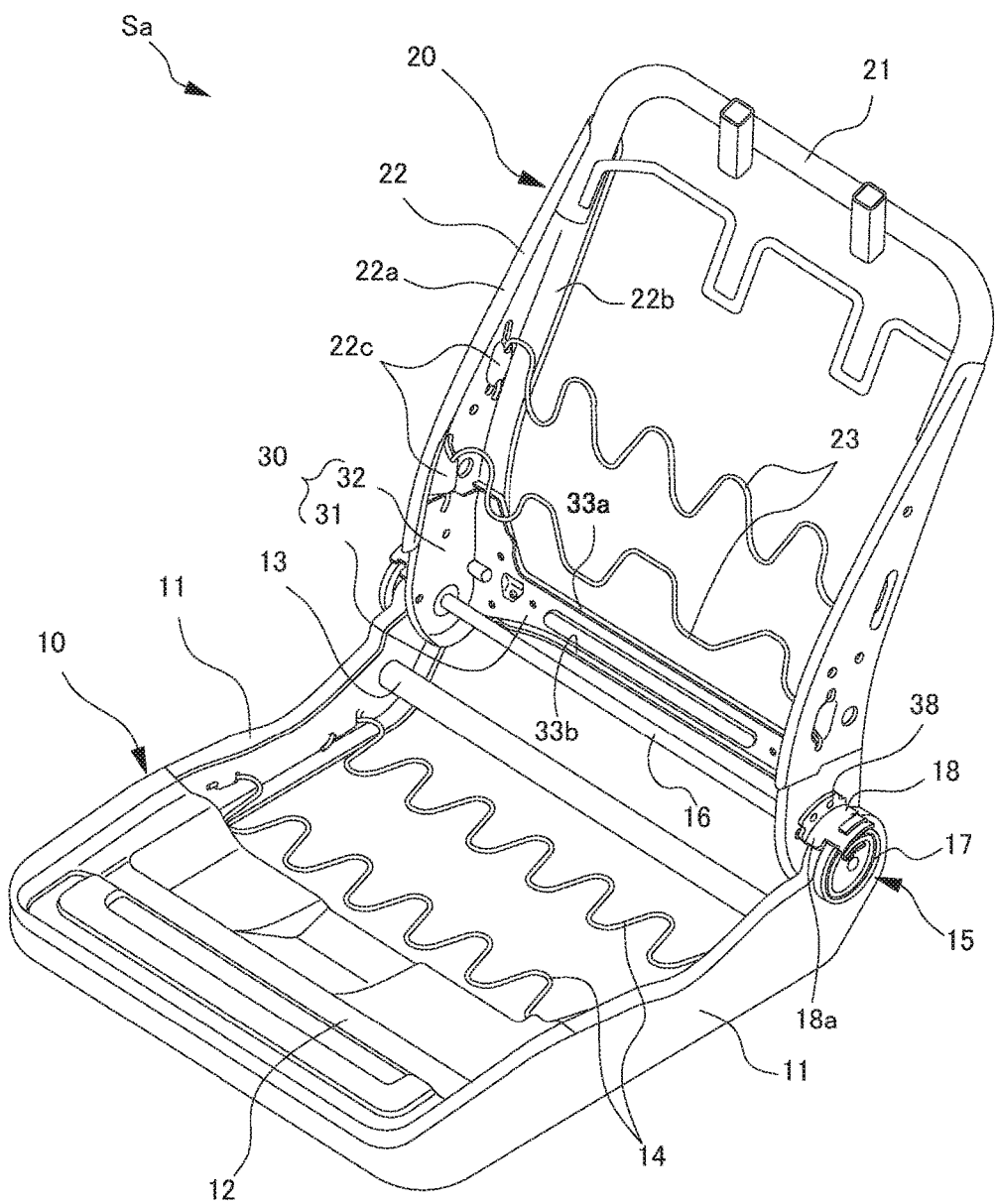
FIG. 2 is a schematic perspective view of a seat frame according to an embodiment.

A vehicle seat S of the present embodiment, as illustrated in FIG. 1, mainly includes a seat cushion 1, a seat back 2 located on a side of a top surface of the seat cushion 1, and a headrest 3 located on a side of a top surface of the seat back 2, and further includes a seat frame Sa that functions as a framework illustrated in FIG. 2.

The side where an occupant is seated with respect to the seat back 2 of the vehicle seat S is the front side.

The seat cushion 1 is a seat portion that supports the occupant from below. A cushion pad 1a is mounted on a cushion frame 10 functioning as a framework illustrated in FIG. 2, and an outer layer 1b covers the cushion pad 1a, whereby the seat cushion 1 is formed.

The seat back 2 is a backrest that supports the back of the occupant from behind. A cushion pad 2a is mounted on a seat back frame 20 functioning as a framework illustrated in FIG. 2, and an outer layer 2b covers the cushion pad 2a, whereby the seat back 2 is formed.

The headrest 3 is a head portion that supports the head of the occupant from behind. A cushion pad 3a is mounted on pillars (not illustrated) as a core, and an outer layer 3b covers the cushion pad 3a, whereby the headrest 3 is formed.

The cushion frame 10 is formed with an approximately rectangular frame body that functions as a framework of the seat cushion 1. As illustrated in FIG. 2, the cushion frame 10 includes cushion side frames 11 provided on right and left sides; a pan frame 12 as a plate-like frame provided between front-side top surfaces of the cushion side frames 11; a frame connecting pipe 13 as a connecting member provided between the vicinities of rear-side ends of the cushion side frames 11; and elastic springs 14 that connect approximately central parts in the front to back direction of the cushion side frames 11.

Each cushion side frame 11 is formed with a sheet metal member that extends in the front to back direction. The cushion side frame 11 on the left side and the cushion side frame 11 on the right side are separated from each other in the right-left direction, in a state of being parallel to each other.

Between the cushion side frames 11 and the seat back frame 20, as illustrated in FIG. 2, there is provided a reclining mechanism 15 that rotatably connects the seat back 2 with respect to the seat cushion 1.

The reclining mechanism 15 has a known mechanism, and includes a connecting shaft 16 that functions as a rotation axis for the reclining mechanism 15; coil springs 17 that energize the seat back frame 20 in an erected state; and spring engagement members 18 on which extension ends of the coil springs 17 are engaged.

The connecting shaft 16 is formed with a pipe member having an approximately circular cross section that connects right and left end portions of the cushion side frames 11 and the seat back frame 20.

The connecting shaft 16 is connected, passing through shaft through-holes (not illustrated) provided at lower ends of right and left end portions of the seat back frame 20, and shaft insertion holes (not illustrated) provided at rear ends of right and left end portions of the cushion side frames 11.

Each of the coil springs 17 is formed with a line member in a coil shape. The coil springs 17 are provided at rear ends of the right and left outer side surfaces of the cushion side frames 11.

Ends on one side of the coil springs 17 are engaged and stopped on the spring engagement members 18, thereby being fixed at the lower ends on the outer sides in the right-left direction of the seat back frame 20. Ends on the other side of the coil springs 17 are engaged and stopped on spring engagement portions (not illustrated) provided on right and left outer side surfaces of the cushion side frame 11.

Each of the spring engagement members 18 is an approximately L-shaped member obtained by bending a sheet metal member. An upper end of the spring engagement member 18 is fixed on the seat back frame 20. The spring engagement member 18 includes a bent portion 18*a* on a lower end thereof, the bent portions being bent toward outer sides in the right-left direction. One ends of the coil springs 17 are engaged and stopped on the bent portions 18*a*.

An operation lever (not illustrated) is attached on an outer side of the cushion side frame 11. By operating this operation lever, the connecting shaft 16 is rotated so that the seat back 2 is rotated with respect to the seat cushion 1.

The seat back frame 20 is an approximately rectangular frame body as illustrated in FIG. 2. The seat back frame 20 includes, on an upper side, an upper frame 21 that is formed with a hollow cylinder and is formed in an approximately reverse U shape; right and left side frames 22 that are provided on the right and left sides to connect the upper frame 21; elastic springs 23 provided between approximately central parts of inner side surfaces of the side frames 22; and a lower frame 30 provided between lower end portions of the inner side surfaces of the side frames 22.

The side frames 22 and the lower frame 30 may be integrally formed.

Each of the right and left side frames 22 is obtained by bending edges of a sheet metal member toward the inner side in the right-left direction, to have an approximately angular U-shape. The right and left side frames 22 are extended in the vertical direction, and are separated from each other in the right-left direction, in a state of being parallel to each other.

Each of the right and left side frames 22 is formed in a shape gradually stretching out to the front side continuously as it comes from the upper side to the lower side, and includes a front bent portion 22*a* bent from a front edge toward the inner side in the right-left direction, and a rear bent portion 22*b* bent from a rear edge toward the inner side in the right-left direction.

On right and left inner side surfaces of the right and left side frames 22, recessed portions 22*c* that are recessed toward the inner sides in the right-left direction, respectively. In the recessed portions 22*c*, through holes that pass therethrough in the vertical direction are formed.

Right and left end portions of the elastic springs 23 are inserted into the through holes of the recessed portions 22*c* to be engaged and stopped, thereby being connected with the right and left side frames 22.

The lower frame 30 is obtained by bending edges of a sheet metal member toward the front side, to have an approximately angular U-shaped cross section. The lower frame 30 is composed of, as illustrated in FIG. 2, a frame main body portion 31 that extends in the right-left direction, and frame bent portions 32 formed by bending right and left ends.

Each of the frame bent portions 32 is arranged to be in contact with an inner side surface of the side frame 22, and an upper end of the frame bent portion 32 and a lower end of the side frame 22 are welded and fixed to each other.

In the frame bent portions 32, shaft through-holes (not illustrated) that pass therethrough in the right-left direction are provided so that the connecting shaft 16 is fit through the shaft through-holes to be connected to the frame bent portions 32.

On outer side surfaces of the frame bent portions 32, spring engagement members 18 are fixed with fastening bolts 38.

The frame main body portion 31 includes an upper edge flange portion 33*a* and a lower edge flange portion 33*b* that protrude to the front side, as illustrated in FIG. 2.

The upper edge flange portion 33*a* and the lower edge flange portion 33*b* are provided on an upper edge portion and a lower edge portion of the frame main body portion 31, respectively, and extend in the right-left direction.

Figure 3:
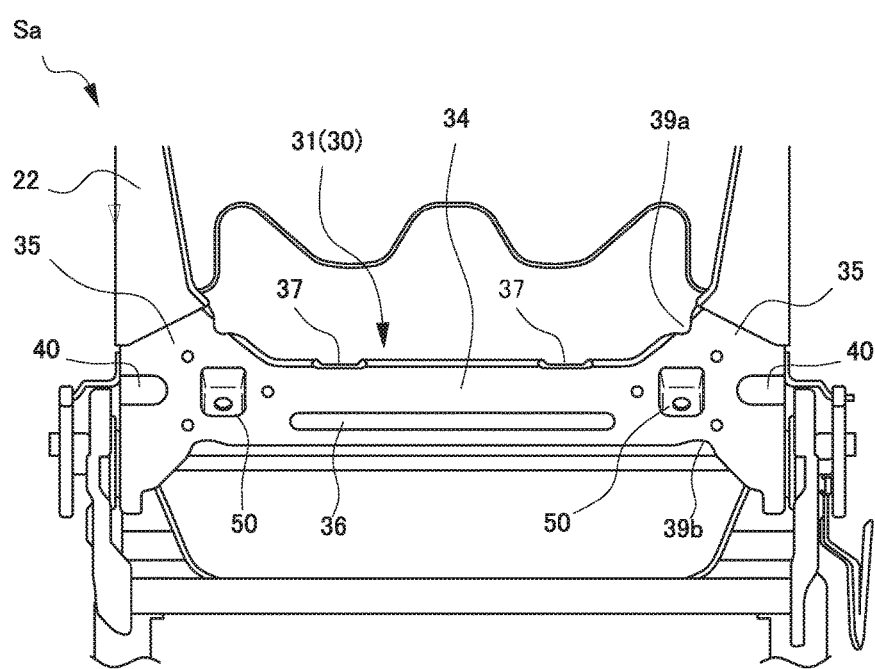
FIG. 3 is a rear view of a lower frame of the seat frame according to an embodiment.

As illustrated in FIG. 3, the frame main body portion 31 is composed of an approximately rectangular frame center portion 34 that extends in the right-left direction, and right and left frame end portions 35 that are provided on the right and left outer sides of the frame center portion 34 and is widened as extending to have a greater width in the vertical direction than the width of the frame center portion 34.

The frame center portion 34 includes a bead-shaped protrusion portion 36 that protrudes to the front side in the lower edge part, and a pair of recessed portions 37 that are recessed downward in a top surface thereof.

The protrusion portion 36 is formed to extend in the right-left direction, between the deformation guiding portions 50 provided on the right and left sides, thereby enhancing the rigidity of the lower edge part of the lower frame 30.

The upper and lower edges of the frame center portion 34 extend toward the right and left outer sides to be approximately horizontal. The upper and lower edges of the right and left frame end portions 35 extend toward the right and left outer sides to be continuous from the upper and lower edges of the frame center portion 34, respectively, while being inclined and spread upward and downward.

Here, the right and left frame end portions 35 are formed in such a manner that positions at which the upper edges start inclining upward is on the inner sides in the right-left direction with respect to positions at which the lower edges start inclining downward, as illustrated in FIG. 3.

In other words, the upper and lower edges of the right and left frame end portions 35 are composed of upward-inclined edges and downward-inclined edges, respectively, and inner-side ends of the upward-inclined upper edges are formed on inner sides in the right-left direction with respect to inner-side ends of the downward-inclined lower edges.

In the upper and lower edges of the right and left frame end portions 35, there are provided a notch portion 39*a* and a notch portion 39b, which are notched toward weakened portions 40 that are described below.

In this way, in the upper and lower edges of the right and left frame end portions 35, parts thereof that include the notch portion 39a and the notch portion 39b are formed as parts having low rigidity.

Figure 4:
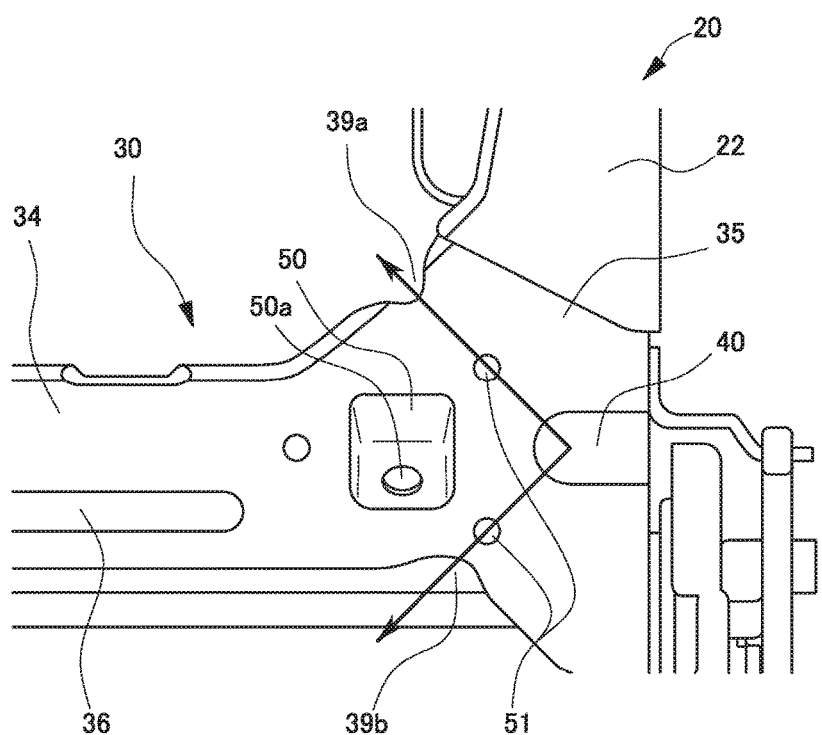
FIG. 4 is an enlarged rear view of a lower frame according to an embodiment.

As illustrated in FIG. 4, each of the right and left frame end portions 35 includes a weakened portion 40 having flexibility for deformation when an impact load is applied upon a rear-end collision or the like; a deformation guiding portion 50 that guides the transmission direction of deformation starting from the weakened portion 40 as a starting point; and an approximately circular hole portion 51.

The weakened portion 40 is a recessed portion that is recessed toward the front side, and extends horizontally in the right-left direction. The weakened portion 40 is formed to have an arc-shaped vertical cross section or a semi-circular arc-shaped vertical cross section.

The weakened portion 40 of the present embodiment is formed as a recessed portion that is recessed toward the front side, but the configuration is not limited to this. The configuration can be varied appropriately. For example, the weakened portions 40 may be formed to be through-holes that pass through the lower frame 30 in the front to back direction.

The weakened portions 40 are arranged, in the right and left frame end portions 35, approximately at the width-direction centers in areas obtained by extending the frame center portion 34 toward the right and left sides with the same vertical-direction width, and regarding the right-left direction, the weakened portions 40 are arranged at ends on the right and left side frame sides, as illustrated in FIG. 4.

The positions where the weakened portions 40 are arranged are not limited to the centers as described above, as long as the weakened portions 40 are arranged within the areas obtained by extending the frame center portion 34 toward the right and left sides with the same vertical-direction width.

Figure 5:
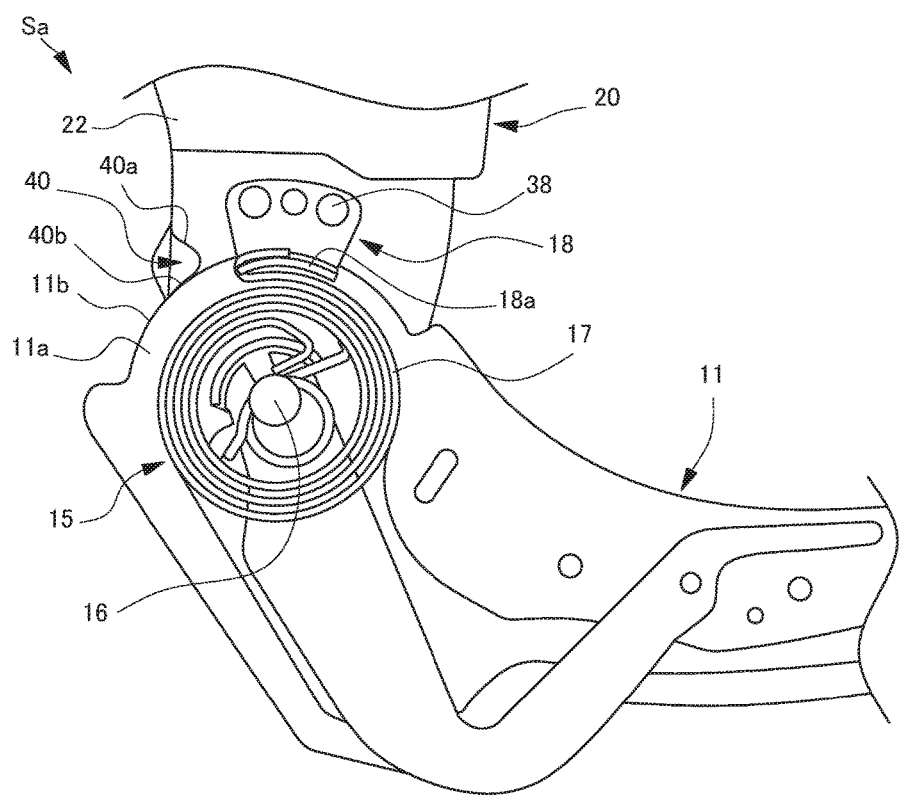
FIG. 5 is an enlarged right side view of a seat frame according to an embodiment.

As illustrated in FIG. 5, the lower end 40b of each weakened portion 40 is arranged, as viewed in the vertical direction, at a lower position than a top surface of a connecting shaft fixing portion 11a that is provided behind the cushion side frame 11, and is formed in close proximity to a circular arc outer edge 11b of the connecting shaft fixing portion 11a, to be along the circular arc outer edge 11b.

Further, the weakened portions 40 are arranged, as viewed in the vertical direction, in close proximity to parts at lower positions than portions where the spring engagement members 18 are fixed with the fastening bolts 38, in the lower frame 30.

A portion where the weakened portion 40 is arranged is a portion that is approximately in the center in the width in the vertical direction in the frame center portion 34, at a lower position than a portion where the spring engagement member 18 is fixed, and above a portion where the connecting shaft 16 is connected. Therefore, this portion has a high rigidity.

In normal use of the vehicle seat S, therefore, it is possible to maintain the rigidity of the seat back frame 20 at a high level.

When an impact load is applied to the seat back frame 20 upon a rear-end collision or the like, the weakened portion 40 is collapsed in the vertical direction, whereby the upper part of the lower frame 30 and the side frames 22 are bent rearward.

Here, the upper end 40a and the lower end 40b of the weakened portion 40 illustrated in FIG. 5 control a collapse amount of the weakened portion 40, that is, controls a rearward inclination angle of the side frame 22 so that the rearward inclination angle should not exceed a predetermined value.

In other words, when the weakened portion 40 is significantly collapsed in the vertical direction, the upper end 40a and the lower end 40b of the weakened portion 40 come into contact with each other, whereby a situation in which the lower end 40b presses and stops the upper end 40a is achieved.

Accordingly, by appropriately adjusting the width in the vertical direction and the width in the front to back direction of the weakened portion 40, the collapse amount of the weakened portion 40, that is, the rearward inclination angle of the side frame 22, can be adjusted.

The deformation guiding portion 50 is a projected portion that projects rearward as illustrated in FIG. 4. The deformation guiding portion 50 extends horizontally in the right-left direction, and is formed to have a triangular-shaped vertical cross section. More specifically, the deformation guiding portion 50 has surfaces that incline from an upper end and a lower end thereof toward the center, and is projected toward a side opposite to the side of the weakened portion 40.

In the right and left frame end portions 35, the deformation guiding portions 50 are arranged in close proximity to the weakened portions 40 in such a manner that the deformation guiding portions 50 are provided on the same horizontal plane as the weakened portions 40, and are arranged on the right and left inner sides in the right-left direction, in other words, on the frame center portion 34 sides.

In this way, the deformation guiding portions 50 are projected on a side opposite to the side of the weakened portions 40, and are arranged in close proximity to the weakened portions 40 in such a manner that the deformation guiding portions 50 are provided on the same horizontal plane as the weakened portions 40. Therefore, the rigidity of the lower frame 30 can be enhanced.

The shape of the deformation guiding portion 50 is not limited particularly, and may be changed appropriately. The deformation guiding portion 50 is projected on a side opposite to the side of the weakened portion 40, but may be projected to the same side as the weakened portion 40. The deformation guiding portion 50 is arranged on the same horizontal plane as the weakened portion 40, but may be arranged slightly above or below in the vertical direction.

In the lower-end-side inclined surface of the deformation guiding portion 50, an approximately circular hole portion 50a is formed.

The hole portion 50a is formed as a hole for attachment of another member such as a harness or the like.

Next, the transmission direction of deformation occurring when an impact load is applied to the vehicle seat S upon a rear-end collision, which starts from the weakened portion 40 as a starting point, is described with reference to FIG. 4.

When an impact load is applied to the seat back frame 20, the weakened portion 40 is deformed to be warped in the vertical direction, and further, the warping deformation is transmitted toward the right and left inner sides in the lower frame 30, which causes the lower frame 30 and the side frames 22 to be bent rearward.

Here, on the right and left inner sides of the right and left weakened portions 40 in the lower frame 30, the deformation guiding portions 50 that are projected toward the side opposite to the side of the weakened portions 40 are provided on the same horizontal plane. Therefore, the transmission direction of the warping deformation is diffused to be inclined upward and downward, avoiding the deformation guiding portions 50, as indicated by the directions of arrows illustrated in FIG. 4.

The upward-inclined transmission directions of deformation starting from the weakened portions 40 as starting points are directed toward the notch portions 39a, which are provided at the upper edges of the right and left frame end portions 35, and the downward-inclined transmission directions of deformation are directed toward the notch portions 39b, which are provided at the lower edges of the right and left frame end portions 35.

In this way, when an impact load is applied to the vehicle seat S, the warping deformation can be transmitted from each weakened portion in two directions, i.e., the upward direction and the downward direction with respect to each weakened portion as a starting point. Therefore, as compared with the case where warping deformation is transmitted in one direction, the impact absorbability can be enhanced further.

Besides, with the deformation guiding portions 50 thus provided, the transmission direction of deformation starting from the weakened portion 40 as a starting point can be guided in preliminarily set directions.

In the present embodiment, portions extended between the weakened portions 40 and the notch portions 39a provided at the upper edges of the right and left frame end portions 35, and portions extended between the weakened portions 40 and the notch portions 39b, serve as deformation areas that are deformed due to an impact load.

The lower frame 30 of the present embodiment is formed in such a manner that positions at which the lower edges of the right and left frame end portions 35 start inclining downward are in closer proximity to the weakened portions 40, as compared with positions at which the upper edges start inclining upward, as illustrated in FIG. 4. In other words, the configuration is such that the rigidity of the lower edges of the right and left frame end portions 35 is smaller than the rigidity of the upper edges thereof.

The configuration is, therefore, such that when an impact load is applied, the transmission direction of deformation starting from the weakened portion 40 as a starting point is guided preferentially downward.

By contrast, the configuration may be such that positions at which the upper edges of the right and left frame end portions 35 start inclining upward are in closer proximity to the weakened portions 40, as compared with positions at which the lower edges start inclining downward. In this case, the transmission directions of deformation starting from the weakened portions 40 as starting points are guided preferentially upward.

Further, the configuration is such that the hole portions 50a are formed on the lower end side of the deformation guiding portions 50 so that the rigidity is smaller below the deformation guiding portions 50. When an impact load is applied, therefore, the transmission directions of deformation starting from the weakened portions 40 as starting points tend to be guided further preferentially downward.

The hole portions 51 are formed as holes for attachment of another member such as a harness or the like, and are provided in a portion extended between the weakened portion 40 and the notch portion 39a, and in a portion extended between the weakened portion 40 and the notch portion 39b, respectively. In other words, the hole portions 51 are provided in areas that are between the weakened portions 40 and the deformation guiding portions 50 as viewed in the right-left direction and between the weakened portions 40 and the notch portions 39a, 39b as viewed in the vertical direction.

In this way, the hole portion 51 are provided so that low-rigidity portions are provided in the deformation areas as second weakened portions. When an impact load is applied, therefore, the transmission directions of deformation starting from the weakened portions 40 as starting points tend to be guided further preferentially toward the notch portions 39a, 39b.

The hole portions 51 may be formed as recessed portions or thin portions, other than the through holes.

Figure 6:
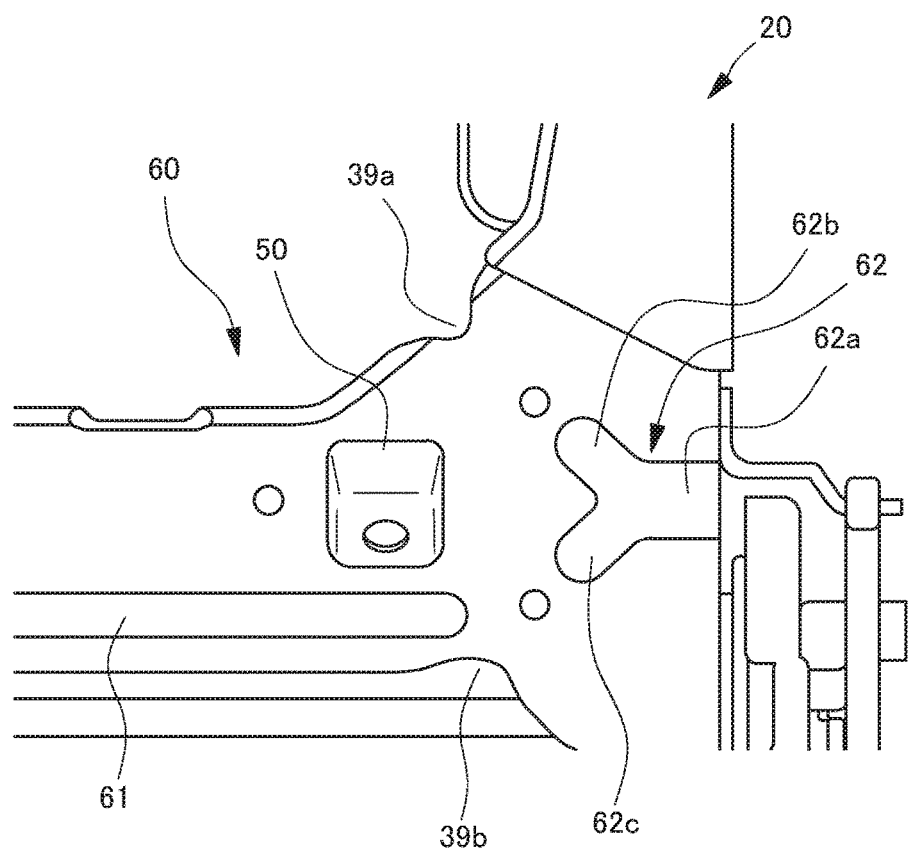
FIG. 6 is an enlarged rear view of a lower frame that illustrates a second embodiment of the present invention.

Next, a lower frame 60 according to a second embodiment of the present invention is described with reference to FIG. 6.

The lower frame 60 includes a bead-shaped protrusion portion 61 that protrudes to the front side in the lower edge part, and weakened portions 62 formed as recessed portions that are recessed toward the front side.

The protrusion portion 61 extends in the right-left direction in such a manner that right and left ends thereof are positioned between the deformation guiding portions 50 and the weakened portions 62, whereby the rigidity of the lower edge part of the lower frame 60 is enhanced.

The weakened portion 62 is formed to have an arc-shaped vertical cross section or a semi-circular arc-shaped vertical cross section, and extends in the right-left direction.

The weakened portion 62 is composed of a horizontal portion 62a that horizontally extends, as well as an upward inclined portion 62b that extends to incline upward, and a downward inclined portion 62c that extends to incline downward, which extend continuously from the horizontal portion 62a to the inner side in the right-left direction.

The upward inclined portion 62b and the downward inclined portion 62c extend toward the notch portion 39a and the notch portion 39b provided at the upper and the lower edges of the lower frame 60, respectively.

Thus, the weakened portion 62 includes the upward inclined portion 62b and the downward inclined portion 62c. When an impact load is applied to the vehicle seat S, therefore, the transmission direction of warping deformation starting from the weakened portion 62 as a starting point can be easily diffused to two directions toward the notch portion 39a and the notch portion 39b, respectively.

Figure 7:
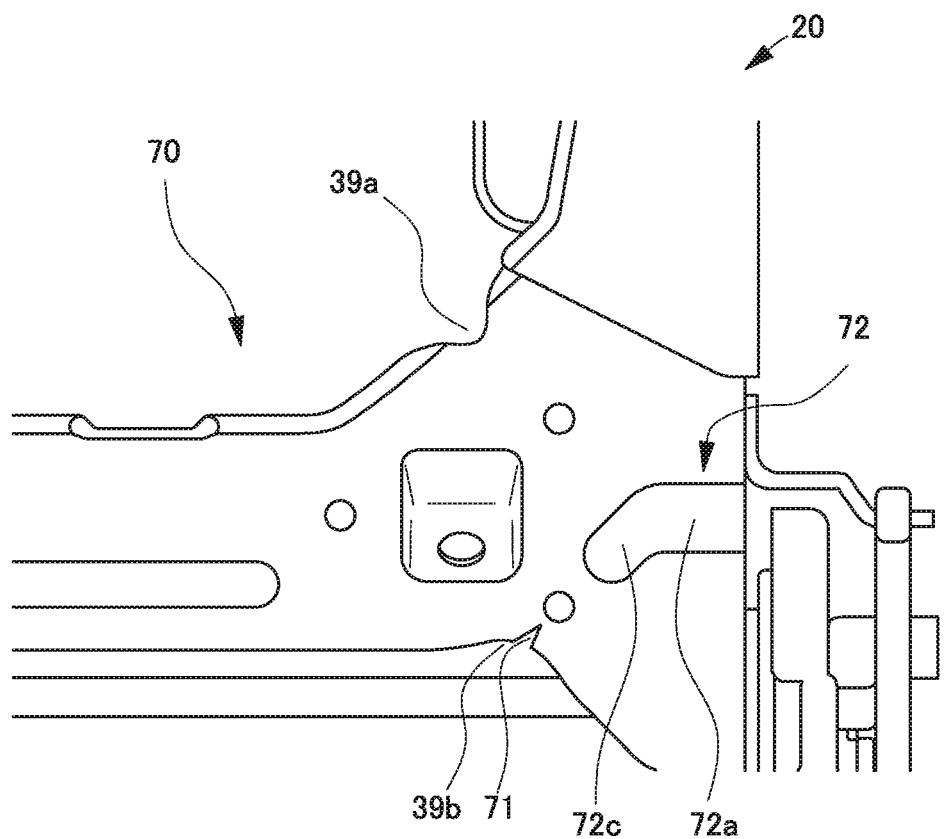
FIG. 7 is an enlarged rear view of a lower frame that illustrates a third embodiment of the present invention.

Next, a lower frame 70 according to a third embodiment of the present invention is described with reference to FIG. 7.

The lower frame 70 includes slits 71 provided in the notch portions 39b in the lower edge part, and weakened portions 72 formed as recessed portions that are recessed toward the front side.

The slit 71 is formed in an approximately V-shaped notch that is notched toward the weakened portion 72, and a part that includes the slit 71 has lower rigidity.

The weakened portion 72 is formed to have an arc-shaped vertical cross section or a semi-circular arc-shaped vertical cross section, and extends in the right-left direction.

The weakened portion 72 is composed of a horizontal portion 72a that horizontally extends, and a downward inclined portion 72c that extends to incline downward continuously from the horizontal portion 72a to the inner side in the right-left direction.

The downward inclined portion 72c extends toward the notch portion 39b provided at the lower edge of the lower frame 60.

When an impact load is applied to the vehicle seat S, the transmission direction of warping deformation starting from the weakened portion 72 as a starting point is diffused to two directions toward the notch portion 39a and the notch portion 39b.

Here, as the weakened portion 72 includes the downward inclined portion 72c, the transmission direction of warping deformation starting from the weakened portion 72 as a starting point can be guided preferentially toward the notch portion 39b side.

Further, as the lower frame 70 includes the slit 71, the transmission direction of warping deformation starting from the weakened portion 72 as a starting point can be guided further preferentially toward the notch portion 39b side.

In each of the above-described embodiments, a front seat of an automobile is described as a specific example, but the present invention is not limited to this. It is needless to say that the present invention is applicable to a middle seat and a rear seat of an automobile.

| REFERENCE NUMERALS | |
|---|---|
| S | vehicle seat |
| Sa | seat frame |
| 1 | seat cushion |
| 1a, 2a, 3a | cushion pad |
| 1b, 2b, 3b | outer layer |
| 2 | seat back |
| 3 | headrest |
| 10 | cushion frame |
| 11 | cushion side frame |
| 11a | connecting shaft fixing portion |
| 11b | outer edge |
| 12 | pan frame |
| 13 | frame connecting pipe |
| 14 | elastic spring |
| 15 | reclining mechanism |
| 16 | connecting shaft |
| 17 | coil spring |
| 18 | spring engagement member |
| 18a | bent portion |
| 20 | seat back frame |
| 21 | upper frame |
| 22 | side frame |
| 22a | front bent portion |
| 22b | rear bent portion |
| 22c | recessed portion |
| 23 | elastic spring |
| 30, 60, 70 | lower frame |
| 31 | frame main body portion |
| 32 | frame bent portion |
| 33a | upper edge flange portion |
| 33b | lower edge flange portion |
| 34 | frame center portion |
| 35 | right and left frame end portions |
| 36, 61 | protrusion portion |
| 37 | recessed portion |
| 38 | fastening bolt |
| 39a, 39b | notch portion |
| 40 | weakened portion |
| 40a | upper end |
| 40b | lower end |
| 50 | deformation guiding portion |
| 50a, 51 | hole portion |
| 62, 72 | weakened portion |
| 62a, 72a | horizontal portion |
| 62b | upward inclined portion |
| 62c, 72c | downward inclined portion |
| 71 | slit |

What is claimed is:

1. A vehicle seat comprising:
a seat back frame, comprising:
side frames that are positioned on right and left sides, and
a lower frame that connects lower parts of the side frames;
wherein:
the lower frame comprises:
a plurality of weakened portions that are deformed when an impact load is applied, and
a plurality of deformation guiding portions that guide directions of the deformation of the plurality of weakened portions;
the plurality of weakened portions are provided at a position corresponding to the plurality of deformation guiding portions as viewed in a vertical direction of the seat back frame;
the plurality of deformation guiding portions are provided in right and left end portions of the lower frame;
the lower frame comprises a protrusion portion in a center portion of the lower frame; and
the protrusion portion extends in a right-left direction of the seat back frame between a pair of the plurality of deformation guiding portions.

2. The vehicle seat according to claim 1, wherein:
the protrusion portion is disposed at a lower position than the plurality of weakened portions.

3. The vehicle seat according to claim 1, wherein:
the protrusion portion is disposed at a lower position than the plurality of deformation guiding portions.

4. The vehicle seat according to claim 1, wherein:
the protrusion portion is disposed in a lower half part of the lower frame.

5. The vehicle seat according to claim 1, wherein:
the plurality of weakened portions and the plurality of deformation guiding portions are positioned in a same horizontal plane, and
the protrusion portion is disposed below the same horizontal plane.

6. The vehicle seat according to claim 1, wherein:
the plurality of weakened portions are disposed on an outer side of the plurality of deformation guiding portions in the right-left direction; and
the plurality of deformation guiding portions are disposed on an outer side of the protrusion portion in the right-left direction.

7. The vehicle seat according to claim 1, wherein:
the plurality of weakened portions, the plurality of deformation guiding portions and the protrusion portion are arranged spaced apart from each other in the right-left direction.

* * * * *